(12) United States Patent
Chone et al.

(10) Patent No.: US 7,133,833 B1
(45) Date of Patent: Nov. 7, 2006

(54) LIGHTWEIGHT DIRECTORY ACCESS PROTOCOL WORKFLOW MANAGEMENT SYSTEM

(75) Inventors: Jeremy Chone, Mountain View; Edwin Khodabakchian, Santa Clara, both of CA (US)

(73) Assignee: Netscape Communications Corporation, Mountain View, CA (US)

( * ) Notice: Subject to any disclaimer, the term of this patent is extended or adjusted under 35 U.S.C. 154(b) by 0 days.

(21) Appl. No.: 09/182,110

(22) Filed: Oct. 27, 1998

(51) Int. Cl.
*G06F 17/60* (2006.01)

(52) U.S. Cl. ......................................................... 705/7
(58) Field of Classification Search ................ 705/7; 707/103, 4; 709/200, 218; 364/578; 395/712
See application file for complete search history.

(56) References Cited

U.S. PATENT DOCUMENTS

| | | | | | |
|---|---|---|---|---|---|
| 5,016,170 | A | * | 5/1991 | Pollalis et al. ................... | 705/7 |
| 5,172,313 | A | * | 12/1992 | Schumacher ..................... | 705/7 |
| 5,490,097 | A | * | 2/1996 | Swenson et al. ............. | 364/578 |
| 5,884,035 | A | * | 3/1999 | Butman et al. .............. | 709/218 |
| 5,920,725 | A | * | 7/1999 | Ma et al. ...................... | 395/712 |
| 5,983,234 | A | * | 11/1999 | Tietjen et al. ................ | 707/103 |
| 5,987,454 | A | * | 11/1999 | Hobbs ............................ | 707/4 |
| 5,995,999 | A | * | 11/1999 | Bharadhwaj ................. | 709/200 |

FOREIGN PATENT DOCUMENTS

| EP | 0869652 | * | 10/1998 |
|---|---|---|---|
| EP | 0955761 | * | 11/1999 |

OTHER PUBLICATIONS

"Microsoft Press Computer Dictionary," Third Edition, Microsoft Corporation, 1997.*
Software Engineering Economics, Barry W. Boehm, Chapt. 4, "The Software Life–Cycle: Phases and Activities," and Chapt. 32 "Software Project Planning and Control", 1981.*

"Mail Without Addresses: Making Directories Work for Mail," presented at EMA '98: Electronic Messaging Association, Apr. 29, 1998.*

"Directory Services Rollout," presented at EMA '98, Electronic Messaging Association, Apr. 29, 1998.*

"The SLAPD and SLURPD Administrators Guide," Release 3.3, University of Michigan, Apr. 30, 1996.*

"Introduction to Directories and the Lightweight Directory Access Protocol," Jeff Hodges, Stanford University, Jun. 18, 1997.*

* cited by examiner

*Primary Examiner*—Vincent Millin
*Assistant Examiner*—Forest O Thompson, Jr.
(74) *Attorney, Agent, or Firm*—Michael A. Glenn

(57) ABSTRACT

A lightweight directory access protocol workflow management system. The invention converts a logical process into a reusable Lightweight Directory Access Protocol (LDAP) directory representation. The directory representation is a hierarchical tree structure where each process element in the process is represented as an LDAP directory entry and is assigned a unique distinguished name and is stored in a Directory Server database or filesystem. The tree structure of the LDAP representation allows the sharing of LDAP trees or subtrees among users. The LDAP trees and subtrees can be remotely located and distributed among different LDAP servers. Another preferred embodiment of the invention provides a graphical user interface for creating a Workflow process definition which is comprised of process elements: activities; actions; and entry/exit points. The user constructs a Workflow process using the process elements, logically interrelating each activity. Once the Workflow process is defined it is converted into an LDAP directory representation and stored in a Directory Server database or filesystem.

27 Claims, 12 Drawing Sheets

LIGHTWEIGHT DIRECTORY ACCESS PROTOCOL WORKFLOW MANAGEMENT SYSTEM

BACKGROUND OF THE INVENTION

1. Technical Field

The invention relates to the storage of business processes in a computer environment. More particularly, the invention relates to the conversion and storage of Workflow processes into a reusable directory hierarchy in a computer environment.

2. Description of the Prior Art

In order to compete in today's fast-paced world, businesses need strong support for their processes. Getting tasks completed quickly and efficiently is the goal of business software.

Ultimately, tasks are completed at a business because people work together. Business productivity software has typically focused on supporting the activity of the specialist in isolation of others. However, individuals do not accomplish business goals in complete isolation, no matter how much sophisticated equipment is placed in front of them. The challenge, therefore, is to bring together a collection of people who may specialize in different fields, and to provide a means to coordinate their different activities toward the accomplishment of a common goal. It is worth thinking of the collection of people as a team that is working toward a common goal while still retaining separate roles.

Business processes (and the Workflow systems that support them) range from mission-critical to administrative. A good example of a mission-critical business process is order fulfillment. Here, a customer places an order which comes into the company. The product is either built or retrieved from a warehouse, it is delivered to the originator, a bill is sent, and the money collected. It is easy to recognize mission-critical business processes because they are so central to what the company does as a business.

In addition to these mission-critical processes, are a multitude of lesser noticed processes which all contribute to the smooth functioning of an organization. Workers submit timecards for processing, submit status change requests of various sorts; run inventories of the warehouse or supply cabinets; produce brochures, manuals, advertisement copy, and notices; handle customer complaints or requests for help; and balance and maintain the accounting books. There are even processes to monitor and change processes in management. Essentially, whenever there is more than one person involved in completing a particular goal, it can be viewed as a process. The processes that are not directly part of the main business, but nevertheless support it, are known as administrative processes.

Manual business processes are slow and unreliable. For a manual business process to work the members of a team need to know not only their own activity, but must also have an understanding of what has happened before this step, and what needs to happen next. Success requires that all of the members have the same understanding of the process. If different members have different understandings, then the process can break down. A document may sit indefinitely in a person's in-box who does not understand the urgency of the situation. A form can be routed to the wrong person and subsequently lost. Some studies have shown that a large part of an organization's time is spent locating misplaced documents.

Manual processes are opaque. When a person submits a request into a manual process, e.g., to purchase something, it is commonly the case that any status of the process will not be available until the very end, when the purchased item does or does not arrive. This lack of information on the progress of the process makes it difficult to plan related activities appropriately. Calling each participant to check up on the status of a request can be very time consuming, both for the originator as well as the person performing the current activity.

Manual processes are difficult to change. All process participants need to be informed of the new process policies. Their compliance can not be guaranteed because of each person's varying interpretation and understanding of the changes. A great deal of time and effort may be expended on improving the way an organization takes care of manual processes.

Many organizations have already recognized the importance of coordination and have launched initiatives to automate business processes. They discover quickly that canned solutions are not possible, especially in the case of white collar workers where the actual business process depends upon the unique skills and capabilities of the individuals in the organization, the business domain, and the culture of the organization. These should be viewed not as random differences between organizations, but rather evidence that the organization has adapted to the specific talents of the individuals available.

The process that an organization uses is often a key differentiator which gives them an edge over their competition. The result is that organizations need to either customize standard solutions or create new custom, applications to support their processes.

An organization has many choices for implementing their custom applications, particularly with regard to main-line business activities. Support for administrative processes is a little more constrained; the value of a given process is modest so it is not worth a large expense to implement a custom application. At the same time there are a large number of these administrative processes, so a significant amount of organizational time could be dedicated to these processes. To support administrative processes, the organization needs a fast and easy way to customize processes to fit their needs; and to change those processes as their needs evolve.

The problem is bringing these processes together into a cohesive, accessible system. An organization's intranet provides connectivity to a vast number of documents and services. The challenge is to have the ability to give access to Workflow processes across the extranet to partners, suppliers, and customers. This would allow the Workflow to extend beyond the organization's employees. The key is to be able to share Workflow processes.

It would be advantageous to provide a lightweight directory access protocol workflow management system that takes a Workflow process and converts it to a reusable format that can be easily shared between entities. It would further be advantageous to provide a lightweight directory access protocol workflow management system that allows the user to easily create Workflow processes in a graphical environment, thereby enhancing the ability to create reusable processes.

SUMMARY OF THE INVENTION

The invention provides a lightweight directory access protocol workflow management system. The invention utilizes an intuitive user interface for creating Workflow processes and converts processes into a reusable directory format that is easily shared among users.

A preferred embodiment of the invention converts a logical process into a reusable directory protocol. The process is converted into a Lightweight Directory Access Protocol (LDAP) directory representation. The directory representation is a hierarchical tree structure where each process element in the process is represented as an LDAP directory entry and is assigned a unique distinguished name. The LDAP representation of the process is stored in a Directory Server database or filesystem.

The tree structure of the LDAP representation allows the sharing of LDAP trees or subtrees among users. The LDAP trees and subtrees can be remotely located and distributed among different LDAP servers.

Another preferred embodiment of the invention provides a graphical user interface for creating a Workflow process definition. The Workflow process is comprised of process elements. These elements are activities, actions, and entry/exit points. The user constructs a Workflow process using the process elements, logically interrelating each activity.

Once the Workflow process is defined it is converted into an LDAP directory representation and stored in a Directory Server database or filesystem as described above.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a lightweight directory access protocol workflow management system for computer applications. A system according to the invention provides a graphical user interface for creating Workflow processes and serializes the processes into an Lightweight Directory Access Protocol (LDAP) directory representation.

Workflow processes are normally defined as a series of activities, inter-related through actions. Activities are tasks that must occur during a process, e.g., review document, approve shipping costs, or collect construction quotes. They also include decision making points (e.g., "has the quote been confirmed?"). An action defines the transition phase between activities (e.g., "the quote has been confirmed," or "the quote is incorrect"). These activities and actions are called process "elements."

Figure 1:
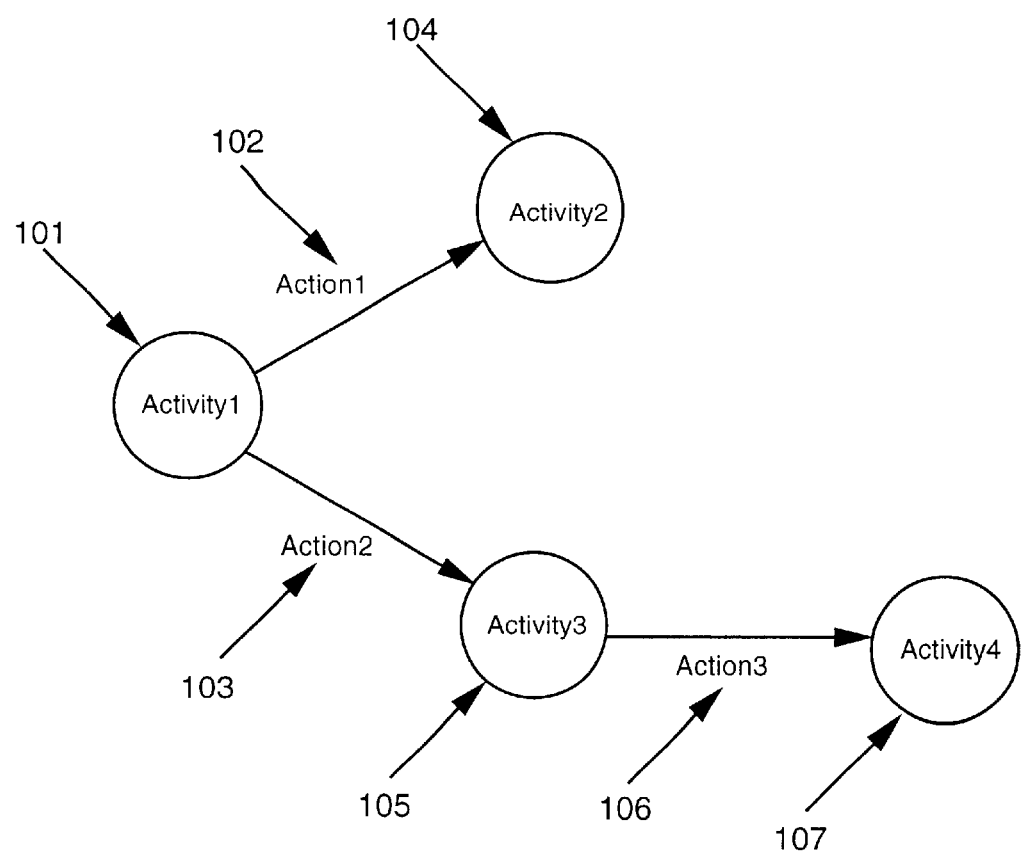
FIG. 1 is a block schematic diagram of a simple process flow according to the invention.

Referring to FIG. 1, a simple process is shown where Activity1 101 has two actions that can occur at that point: Action1 102 and Action2 103. Each action belongs to an activity and has a target. Here, Action1 102 belongs to Activity1 101 and has a target of Activity2 104. Similarly, Action2 103 belongs to Activity1 101 and has a target of Activity3 105.

A preferred embodiment of the invention accepts a Workflow process definition containing logically related process elements. The process elements are converted into a hierarchical tree representation using the Lightweight Directory Access Protocol (LDAP).

The LDAP protocol typically provides access to directories supporting the X.500 models, while not incurring the resource requirements of the X.500 Directory Access Protocol (DAP). This protocol is specifically targeted at management and browser applications that provide read/write interactive access to directories. It has been widely used as a means for accessing X.500 (and more recently, non-X.500) directory systems.

LDAP is an extensible, vendor-independent, network protocol standard. It supports hardware, software, and network heterogeneity. An LDAP-based directory supports any type of data, e.g., text, photos, Universal Resource Locators (URLs), pointers, and binary data, in a hierarchical namespace.

The invention uses the LDAP structure to serialize the logical process definition. This is done by representing each process element as an LDAP directory entry. The resulting directory entries form a hierarchical tree structure.

Figure 2:
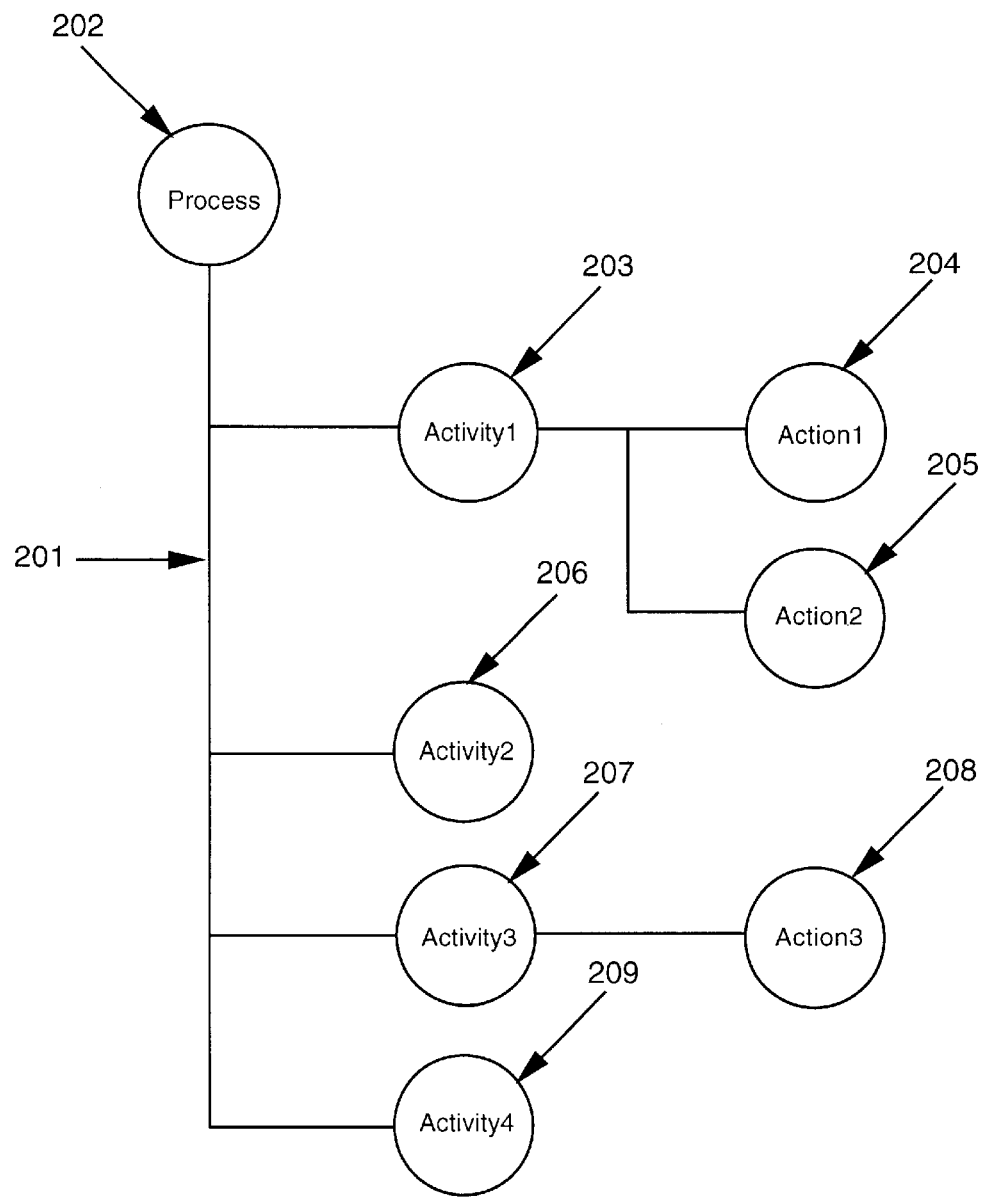
FIG. 2 is a block schematic diagram of a tree representation of a simple process according to the invention.

With respect to FIGS. 1 and 2, the activities from FIG. 1 are represented in a hierarchical tree structure. The process is shown as the root 202 of the tree 201. Beneath the root are the activities. Action1 204 and Action2 205 belong to Activity1 203 and are shown as children of Activity1's 203 node. Activity2 104 is represented as a leaf 206. Action3 208 is below Activity3 207. Activity4 107 is shown as a leaf 209.

Figure 3:
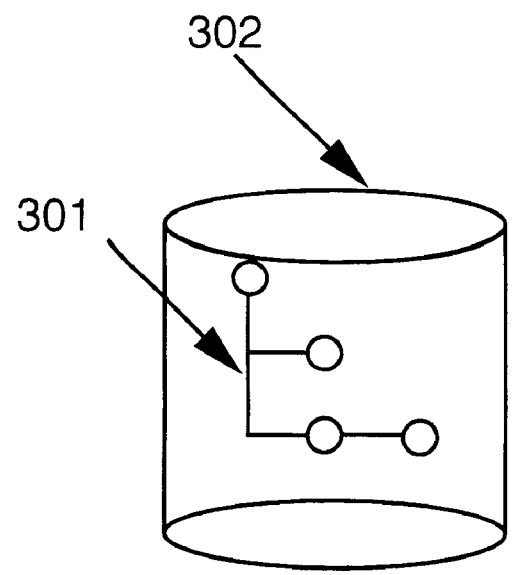
FIG. 3 is a block schematic diagram of a tree representation of a simple process stored in a Directory Server database or filesystem according to the invention.
Figure 4:
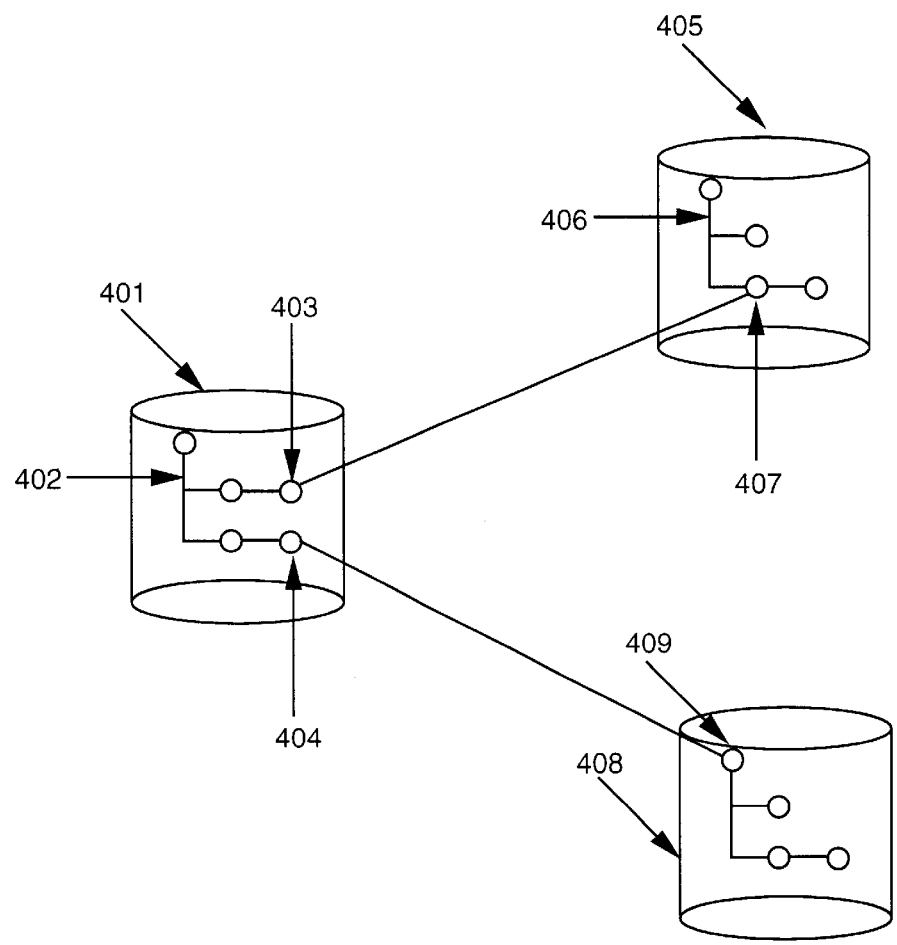
FIG. 4 is a block schematic diagram of tree structures sharing trees and subtrees of remote lightweight directory access protocol (LDAP) directories according to the invention.

Referring to FIGS. 3 and 4, the tree structure 301 is stored in a Directory Server database or filesystem 302. This allows for transportability of the process definition. The tree structure allows for the sharing of subtrees among processes. A process 402 in a filesystem 401 can have an action 403 from an activity refer to a subtree 407 of a tree 406 in another filesystem or LDAP server 405. Additionally, an activity can have an action 404 that refers to another process definition 409.

A real-world example of the sharing of process definition trees is a company that has a manufacturing and shipping process definition. An accounting process is required during the manufacturing of a product. The company does not have the accounting resources in-house. The manufacturing and shipping process definition will point to an ADP process definition through the Internet. The ADP process has been customized for the use of its customers and performs the required accounting tasks.

Once the product has been manufactured, the shipping department sends the product out to customers through UPS. The manufacturing and shipping process definition refers to a delivery process definition at the UPS site. The UPS process definition initiates the pickup, tracking, delivery, and billing for the company.

A major advantage of this method is that companies can market and sell access to their particular process definitions. Customers simply create their own process definitions that refer to the supplier's process definitions.

Figure 5:
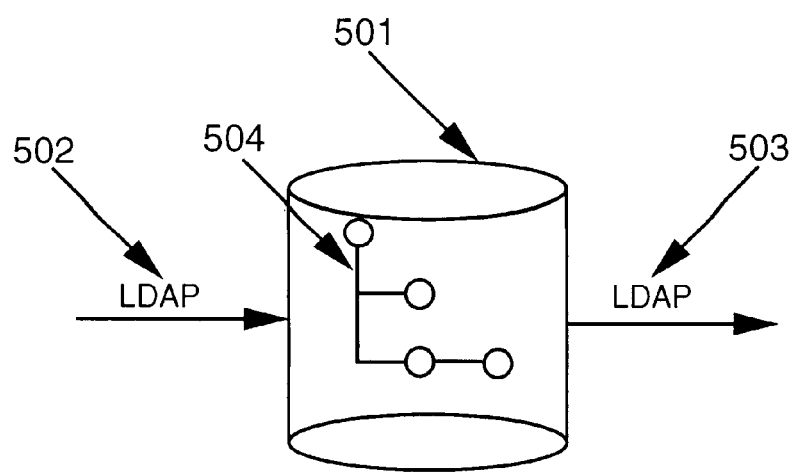
FIG. 5 is a block schematic diagram of the LDAP data flow through a Directory Server database created by a preferred embodiment of the invention according to the invention.

With respect to FIG. 5, the Directory Server database or filesystem 501 containing the LDAP process definition 504 is a pure LDAP configuration. That is, the only data going into 502 the Directory Server database 501 is LDAP information adding, deleting, or modifying entries and the data being read 503 from the Directory Server database 501 are LDAP entries.

Figure 6:
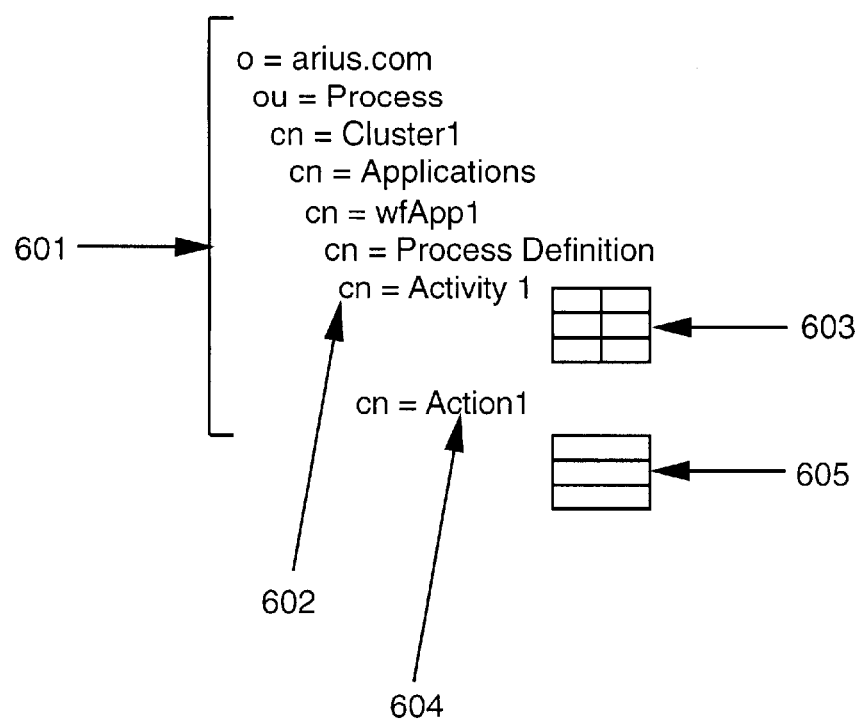
FIG. 6 is a block schematic diagram of an activity of a process represented as an LDAP entry according to the invention.

Referring to FIG. 6, a typical LDAP activity entry 601 is shown. Where:

o=organization;

ou=organizationalUnit; and cn=commonName.

The entry 601 contains the activity 602 particulars in a table 603, e.g., a value/pair table. The particulars can include a JavaScript method, form, or task description. The action 604 has its target described in an associated Distinguished Name entry 605. The Distinguished Name is the relative pathway used to represent the elements of a process, e.g., activity, action, entry point, or exit point. The pathway is used to reference each element.

Figure 7:
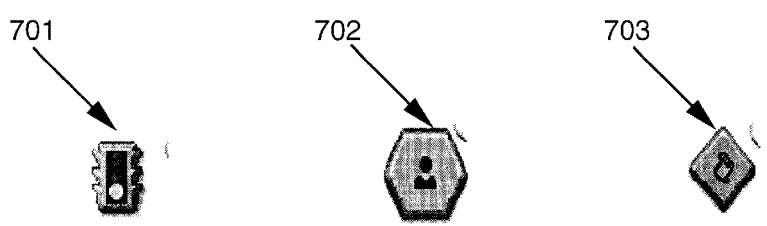
FIG. 7 is a block schematic diagram of the graphical representations of three classes of activities according to the invention.

For example, the Distinguished Name for Action1 is:

cn=Action1, cn=Activity1, cn=Process Definition, cn=wfApp1, cn=Applications, cn=Cluster1, ou=Process, o=arius.com With respect to FIG. 7, another preferred embodiment of the invention offers a graphical user interface allowing the user to create his process definition pictorially. The user determines the steps that are in the process. These steps are also called Activities. Activities are a unit of work that needs to be accomplished as part of the process (e.g., "the operator needs to validate the level of emergency," "someone in the HR department needs to call the lawyer," or "the manager needs to verify the expense report"). There are three classes of activities available:

Entry/exit Points 701: These represent the points in the process where new instances start or end. A process definition can include multiple entry and exit points. Entry points are represented in green and exit points are red.

Manual Activities 702: Represent units of work that need to be performed by a user (human participant).

Automated Activities 703: They represent units of work that can be automated through Scripts (e.g., "Update the Bug Tracking System," "Look up and gather user related information," "Validate data," etc.).

This allows Workflow designers to rapidly create Workflow applications using a visual Workflow design tool. The designers lay out the process graphically with icons representing activities, branches, and automated scripts.

Figure 8:
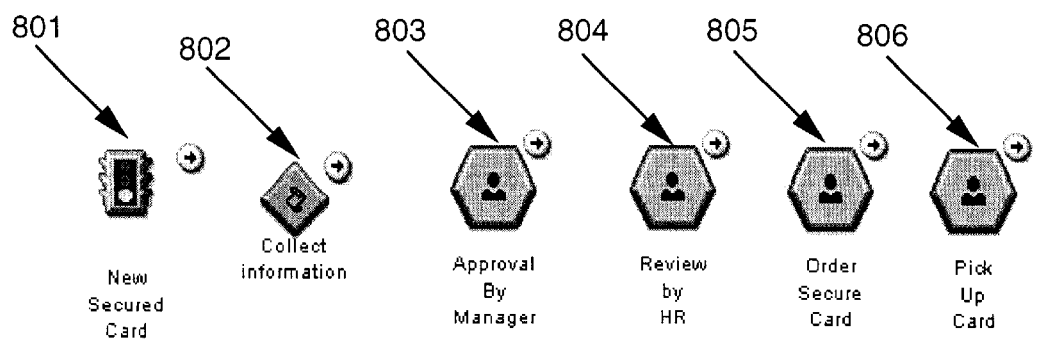
FIG. 8 is a block schematic diagram of the graphical representations of process elements for an example of a Workflow process according to the invention.

Referring to FIG. 8, an example of a Secured Card application process is shown. The activities are represented as follows:

The New Secured Card 801 entry point represents the point where users ask for a new secure card and therefore create a new instance of the process.

The Collect Information automated activity 802 represents the need of reading some user related information from the Corporate Directory. The user does not need to specify his employee number, his phone number, the name and extension of his manager since all this information already exists in the Corporate Directory. A script will look up the corporate directory and read the user related information.

The Approval By Manager manual activity 803 represents the need for the manager of the initiator to approve or deny the request.

The Review by HR manual activity 804 represents the need for HR, in the case the initiator is not a US citizen, to review and validate the request.

The Order Secure Card manual activity 805 represents the need for someone in the security department to order and configure the SecureCard.

The Pick Up Card manual activity 806 represents the need to the initiator to come and pick up the card once the request has been processed.

The next task is to determine how those activities are correlated and how to synchronize their execution. These actions are represented by arrows. As noted above, actions have a source and a target. The user can also use a type of node called a decision point to translate business rules that contains "if" statements (e.g., "if the severity of the alert is very high, then I need the operator to look into the log and report the error message, else we only need to notify the developers that an alert has been generated," "if the price of the printer whose datasheet is being created is greater than $1,000 then we need the VP of the division to validate the final datasheet before . . . ," etc.).

Figure 9:
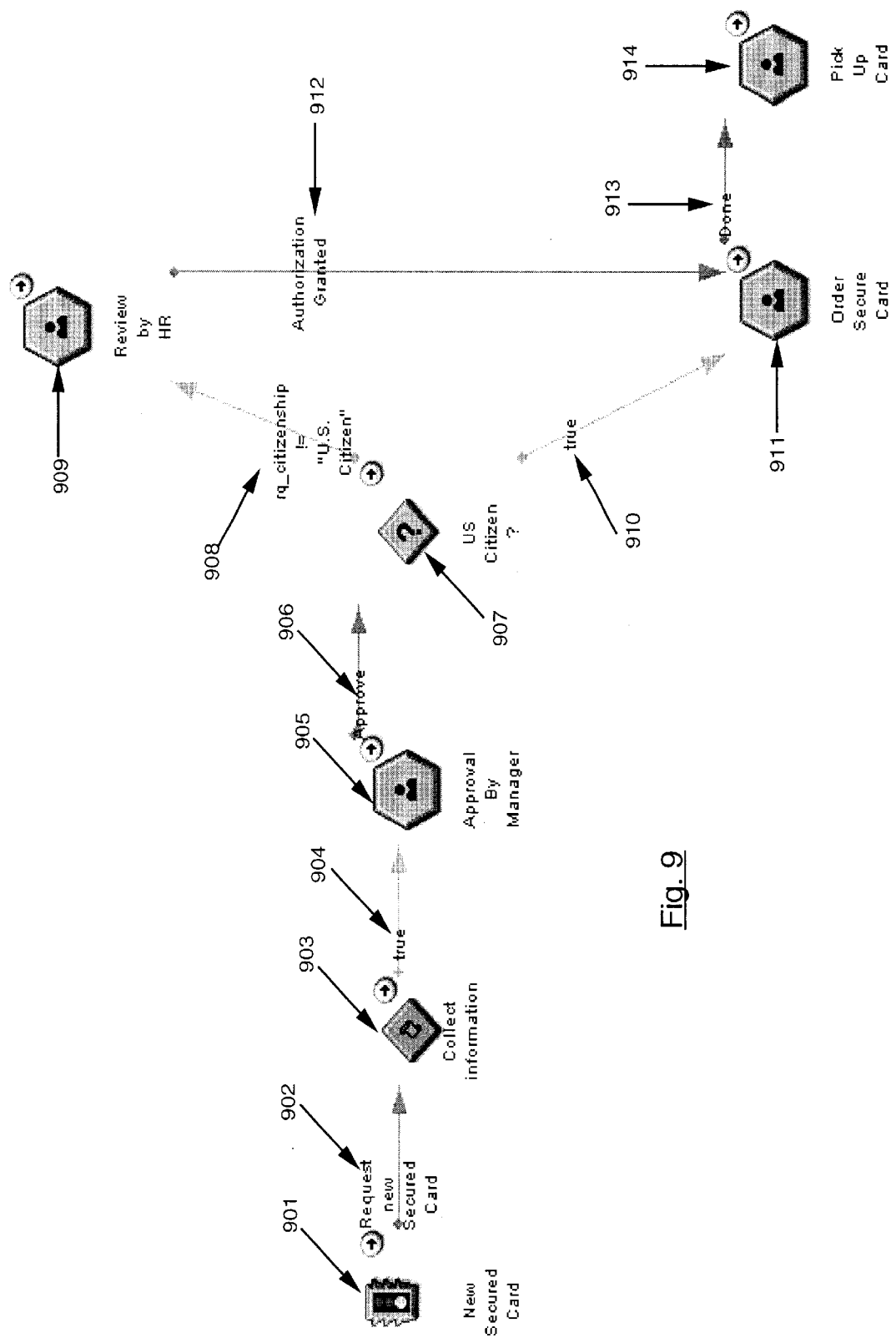
FIG. 9 is a block schematic diagram of an example of a Workflow process represented graphically by a preferred embodiment of the invention according to the invention.

With respect to FIG. 9, the process map contains a set of activities and decision points with action transition arrows describing the sequence in which and the conditions why activities need to be executed. The user drags the appropriate icon into the process and enters the description of the element. Actions are then drawn between elements and the transition description entered into the action entry. For example, a decision point 907 is used to translate the fact that the Review by HR activity 909 needs to be performed only if the initiator is not a U.S. Citizen 908.

Figure 10:
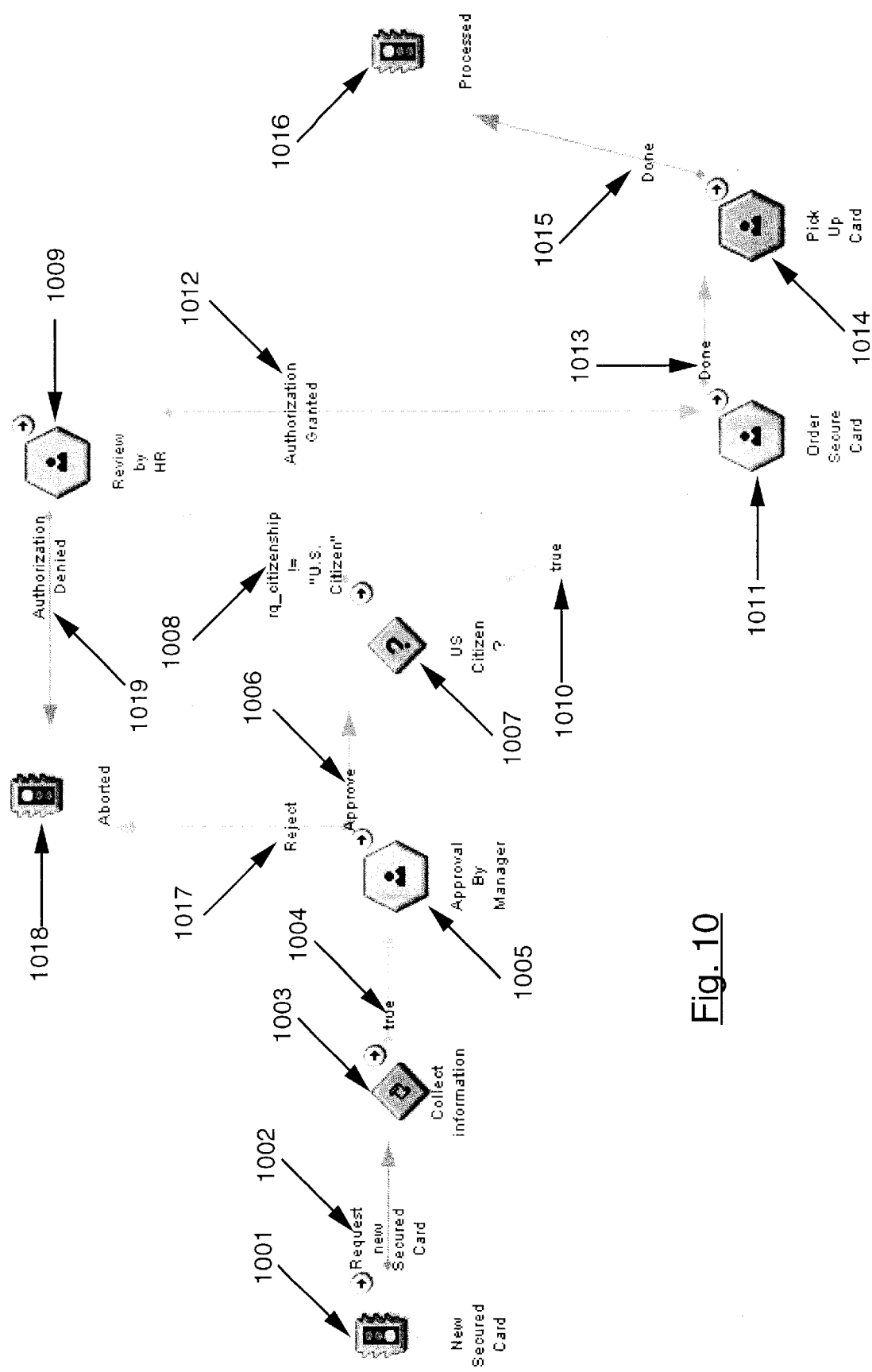
FIG. 10 is a block schematic diagram of an example of a Workflow process containing exit points represented graphically by a preferred embodiment of the invention according to the invention.

Referring to FIG. 10, exit points 101 6, 1018 are also added to the process. Exit points are special nodes that describe that the process ends because it has been aborted, canceled or because it ended successfully. The exit point Aborted 1018 is the target for two actions 1019 and 1017.

Once the process definition has been fully defined, the invention serializes the process definition by converting it into LDAP entries. The following is an example of the LDAP entries used in this application. The Distinguished Name and associated entries for the Approval By Manager activity 1005 is:

dn: cn=Approval By Manager, cn=ProcessDictionary,
cn=wfSecureAccessCard, cn=Applications, cn=Local location
prettyname: Approval By Manager
allowdelegate: false
allowsave: false
cn: Approval By Manager
assignmentplugin: toManagerByAttrOrGroup()
schemaversion: 1.0
creatorsname: cn=Directory Manager
description: <Initialize your description>
createtimestamp: 19980903211641Z
positiony: 276
objectclass: WFBase
objectclass: WFPosition
objectclass: WFActivity
positionx: 336
recent: false
The LDAP entry for the action Reject 1017 is:
dn: cn=Reject, cn=Approval By Manager, cn=ProcessDictionary,
cn=wfSecureAccessCard, cn=Applications, cn=Local location
createtimestamp: 19980903211641Z
cn: Reject
prettyname: Reject
objectclass: WFBase
objectclass: WFAction
targetnodedn: cn=Aborted, cn=ProcessDictionary, cn=wfSecureAccessCard,
cn=Applications, cn=Local location
creatorsname: cn=Directory Manager
description: <Initialize your description>
The LDAP entry for the action Approve 1006 is:
dn: cn=Approve, cn=Approval By Manager, cn=ProcessDictionary,
cn=wfSecureAccessCard, cn=Applications, cn=Local location
createtimestamp: 19980903211641Z
cn: Approve
prettyname: Approve
objectclass: WFBase
objectclass: WFAction
targetnodedn: cn=US Citizen?, cn=ProcessDictionary,
cn=wfSecureAccessCard, cn=Applications, cn=Local location
creatorsname: cn=Directory Manager
description: <Initialize your description>

Figure 11:
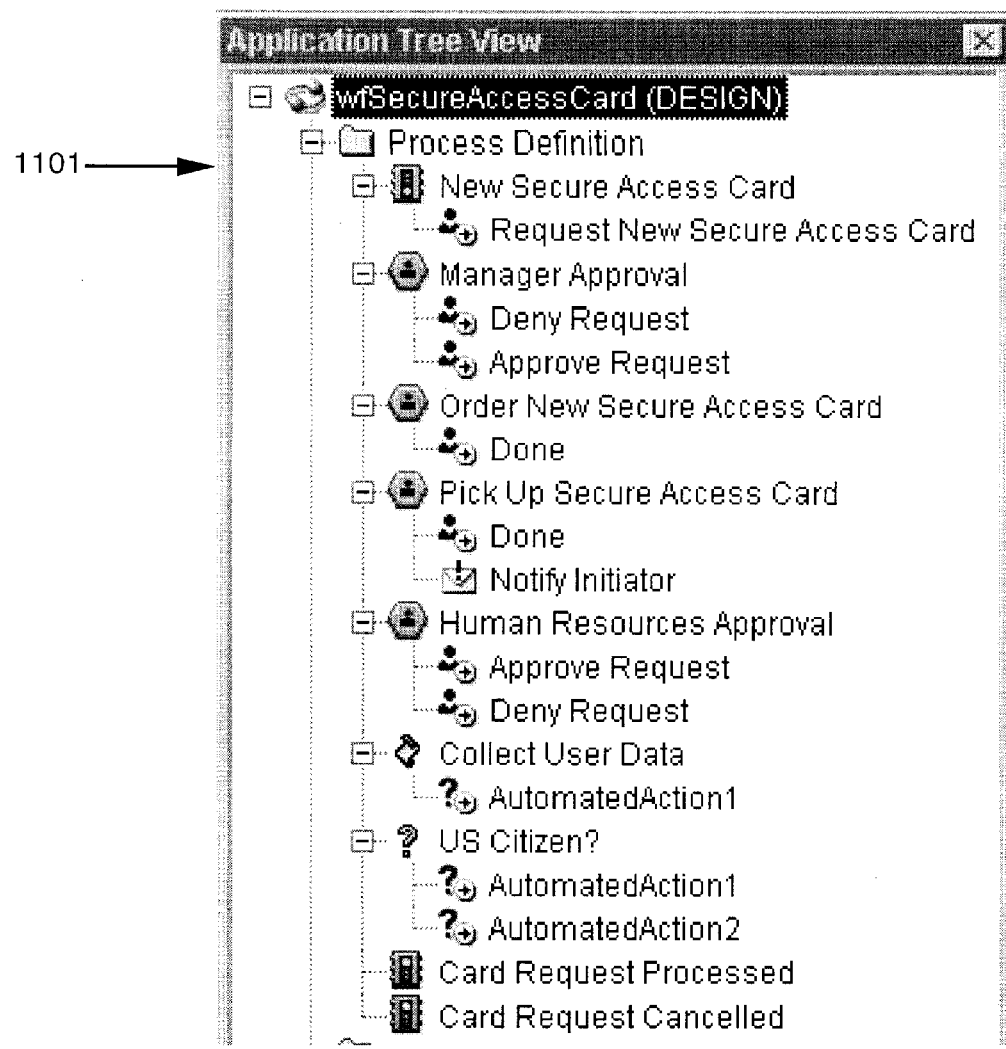
FIG. 11 is a block schematic diagram of a tree structure representation of a Workflow process displayed by a preferred embodiment of the invention according to the invention.

With respect to FIG. 11, the process definition described above is shown pictorially using a tree structure 1101. This view is available to the user as he constructs his process definition.

Figure 12:
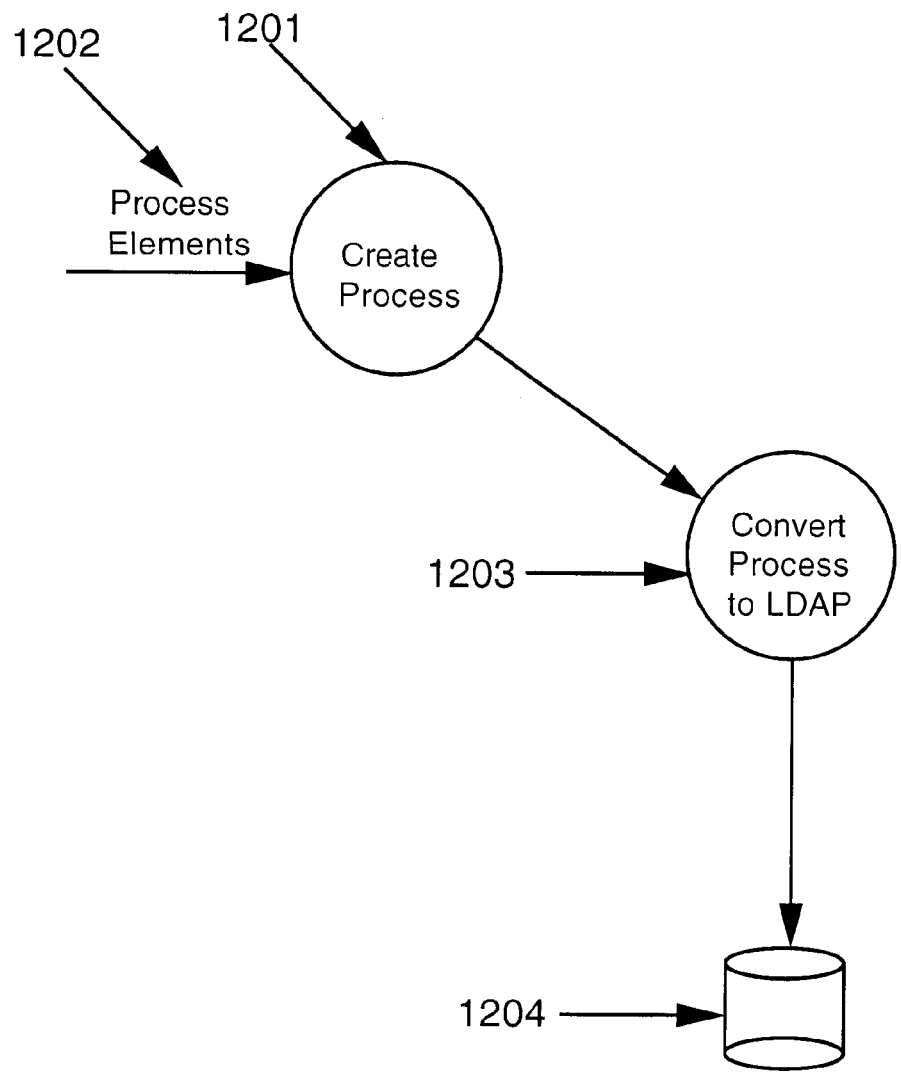
FIG. 12 is a block schematic diagram of a task-oriented view of the invention according to the invention.

Referring to FIG. 12, the Create Process module 1201 accepts the process elements 1202 defined by the user. It creates the logical representation of the process and associates a hierarchical tree structure to the process. It sends this representation to the Convert Process to LDAP module 1203.

The Convert Process to LDAP module 1203 serializes the process definition to an LDAP representation and stores it into the Directory Server database or filesystem 1204.

One skilled in the art will readily appreciate that such a mechanism is not dependent upon the schema. Any logical structure can be converted into an LDAP representation using the method described.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for converting a logical process into a reusable directory protocol in a computer environment, comprising the steps of:

creating a logical process definition;

serializing said process into a Lightweight Directory Access Protocol (LDAP) directory representation, wherein said directory representation is a hierarchical tree structure; and wherein each process element in said process is represented as an LDAP directory entry.

2. The process of claim 1, further comprising the step of:

storing said LDAP representation into a Directory Server database or filesystem.

3. The process of claim 1, wherein said LDAP representation refers to other LDAP trees or subtrees and wherein said other LDAP trees or subtrees can be remotely located.

4. A process for defining and converting a Workflow process into a reusable directory protocol in a computer environment, comprising the steps of:

providing a graphical user interface for creating a Workflow process definition;

converting said Workflow process definition into a Lightweight Directory Access Protocol (LDAP) directory representation, wherein said directory representation is a hierarchical tree structure;

storing said LDAP representation into a Directory Server database or filesystem;

wherein each process element in said process is represented as an LDAP directory entry; and wherein each process element is assigned a unique distinguished name.

5. The process of claim 4, wherein activities, actions, and entry/exit points are the process elements in said Workflow process definition.

6. The process of claim 5, wherein each activity has a table associated with it describing said activities' task description, method, or script.

7. The process of claim 5, wherein each of said actions have an associated activity and target.

8. The process of claim 4, wherein said LDAP representation refers to other LDAP trees or subtrees, and wherein said other LDAP trees or subtrees can be remotely located.

9. The process of claim 4, wherein said graphical user interface displays said Workflow process definition using a tree structure.

10. An apparatus for converting a logical process into a reusable directory protocol in a computer environment, comprising:

creating a logical process definition;

serializing said process into a Lightweight Directory Access Protocol (LDAP) directory representation, wherein said directory representation is a hierarchical tree structure; and wherein each process element in said process is represented as an LDAP directory entry.

11. The apparatus of claim 10, further comprising:
storing said LDAP representation into a Directory Server database or filesystem.

12. The apparatus of claim 10, wherein said LDAP representation refers to other LDAP trees or subtrees and wherein said other LDAP trees or subtrees can be remotely located.

13. An apparatus for defining and converting a Workflow process into a reusable directory protocol in a computer environment, comprising:
a module for creating a Workflow process definition;
a graphical user interface for creating said Workflow process definition;
a module for converting said Workflow process definition into a Lightweight Directory Access Protocol (LDAP) directory representation, wherein said directory representation is a hierarchical tree structure;
a module for storing said LDAP representation into a Directory Server database or filesystem;
wherein each process element in said process is represented as an LDAP directory entry; and
wherein each process element is assigned a unique distinguished name.

14. The apparatus of claim 13, wherein activities, actions, and entry/exit points are the process elements in said Workflow process definition.

15. The apparatus of claim 14, wherein each activity has a table associated with it describing said activities' task description, method, or script.

16. The apparatus of claim 14, wherein each of said actions have an associated activity and target.

17. The apparatus of claim 13, wherein said LDAP representation refers to other LDAP trees or subtrees, and wherein said other LDAP trees or subtrees can be remotely located.

18. The apparatus of claim 13, wherein said graphical user interface displays said Workflow process definition using a tree structure.

19. A program storage medium readable by a computer, tangibly embodying a program of instructions executable by the computer to perform method steps for converting a logical process into a reusable directory protocol in a computer environment, comprising the steps of:
creating a logical process definition;
serializing said process into a Lightweight Directory Access Protocol (LDAP) directory representation, wherein said directory representation is a hierarchical tree structure; and
wherein each process element in said process is represented as an LDAP directory entry.

20. The program storage medium of claim 19 embodying the program of instructions to perform the method steps further comprises the step of:
storing said LDAP representation into a Directory Server database or filesystem.

21. The program storage medium of claim 19 embodying the program of instructions to perform the method steps,
wherein said LDAP representation refers to other LDAP trees or subtrees and wherein said other LDAP trees or subtrees can be remotely located.

22. A program storage medium readable by a computer, tangibly embodying a program of instructions executable by the computer to perform method steps for defining and converting a Workflow process into a reusable directory protocol in a computer environment, comprising the steps of:
creating a Workflow process definition;
providing a graphical user interface for creating a Workflow process definition;
converting said Workflow process definition into a Lightweight Directory Access Protocol (LDAP) directory representation, wherein said directory representation is a hierarchical tree structure;
storing said LDAP representation into a Directory Server database or filesystem;
wherein each process element in said process is represented as an LDAP directory entry; and
wherein each process element is assigned a unique distinguished name.

23. The program storage medium of claim 22 embodying the program of instructions to perform the method steps,
wherein activities, actions, and entry/exit points are the process elements in said Workflow process definition.

24. The program storage medium of claim 23 embodying the program of instructions to perform the method steps,
wherein each activity has a table associated with it describing said activities' task description, method, or script.

25. The program storage medium of claim 23 embodying the program of instructions to perform the method steps,
wherein each of said actions have an associated activity and target.

26. The program storage medium of claim 22 embodying the program of instructions to perform the method steps,
wherein said LDAP representation refers to other LDAP trees or subtrees, and wherein said other LDAP trees or subtrees can be remotely located.

27. The program storage medium of claim 22 embodying the program of instructions to perform the method steps,
wherein said graphical user interface displays said Workflow process definition using a tree structure.

* * * * *